United States Patent [19]

Takanashi et al.

[11] Patent Number: 5,161,007
[45] Date of Patent: Nov. 3, 1992

[54] RECORDING HEAD WITH CARRIER GENERATION AND TRANSPORT LAYERS ADJACENT A PHOTO-MODULATION LAYER FOR RECORDING INFORMATION INCLUDED IN AN ELECTRO-MAGNETIC RADIATION-BEAM APPLIED THERETO

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 691,614

[22] Filed: Apr. 25, 1991

[30] Foreign Application Priority Data

Apr. 27, 1990 [JP] Japan .................. 2-112942

[51] Int. Cl.⁵ .............. H04N 3/10; H04N 1/028; G02F 1/135
[52] U.S. Cl. ................... 358/43; 358/44; 358/55; 358/213.13; 358/225; 358/75; 358/471; 358/909; 359/68; 359/72; 359/250; 359/252; 359/254; 359/255; 359/273; 359/296; 365/108; 365/112
[58] Field of Search ........... 358/41, 43, 44, 55, 358/209, 213.13, 225, 471, 75, 909; 359/68, 72, 246, 250, 252, 254, 255, 891, 273, 296; 365/108, 112

[56] References Cited

U.S. PATENT DOCUMENTS

| | | | |
|---|---|---|---|
| 3,723,651 | 3/1973 | Gorog | 359/72 |
| 3,769,512 | 10/1973 | Grenot . | |
| 3,932,025 | 1/1976 | Lakatos | 365/112 |
| 3,957,349 | 5/1976 | Nelson | 359/72 |
| 4,692,779 | 9/1987 | Ando . | |
| 4,712,878 | 12/1987 | Taniguchi | 359/68 |
| 4,831,452 | 5/1989 | Takanashi | 358/213.13 |
| 4,945,423 | 7/1990 | Takanashi . | |
| 4,956,713 | 9/1990 | Takanashi | 358/213.13 |
| 4,956,714 | 9/1990 | Takanashi | 358/213.13 |
| 4,975,776 | 12/1990 | Takanashi | 358/213.13 |
| 5,006,935 | 4/1991 | Takanashi | 358/213.13 |
| 5,027,216 | 6/1991 | Takanash | 358/213.13 |

FOREIGN PATENT DOCUMENTS 2-22924 9/1990 Japan .
2-306790 12/1990 Japan .

Primary Examiner—Mark J. Reinhart
Assistant Examiner—Scott A. Rogers
Attorney, Agent, or Firm—Lowe, Price, LeBlanc & Becker

[57] ABSTRACT

A recording apparatus comprises first electrode, color-separation filter, recording, carrier generation, carrier transport, and second electrode layers which are laminated in order of mention. The recording layer and carrier generation layer may be separated at a given space. The recording layer comprises carrier retaining layer or a photo-modulation layer. Light image from an object is projected on the carrier generation layer through the first electrode, color-separation, and recording layers via an object lens enters the carrier generation layer. Carrier generated in the carrier generation layer in response to the light image are transported to the second electrode in response to application of a given voltage between the first and second electrodes. Discharge caused by application of the given voltage transfers a latent carrier image to the recording layer. The first electrode, color-separation filter and recording layers may be used for recording medium. The carrier generation, the carrier transport, and second electrode layers may be used as a recording head.

9 Claims, 4 Drawing Sheets

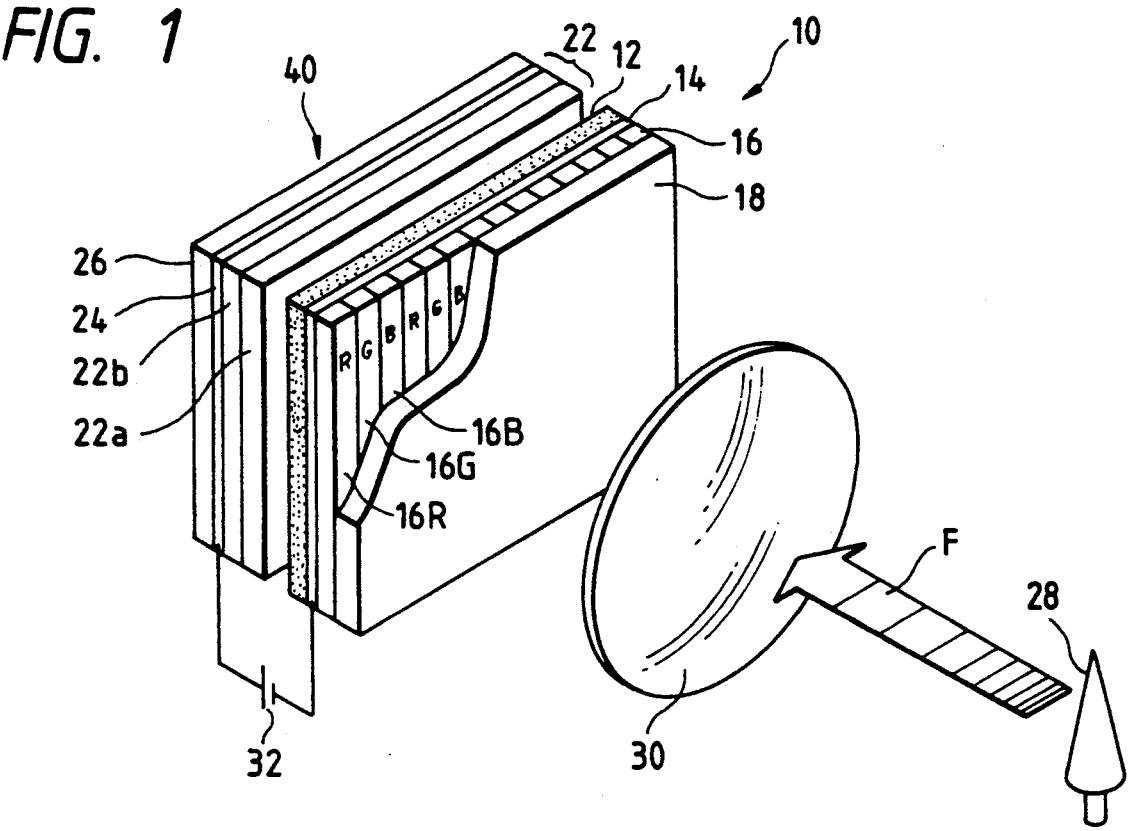
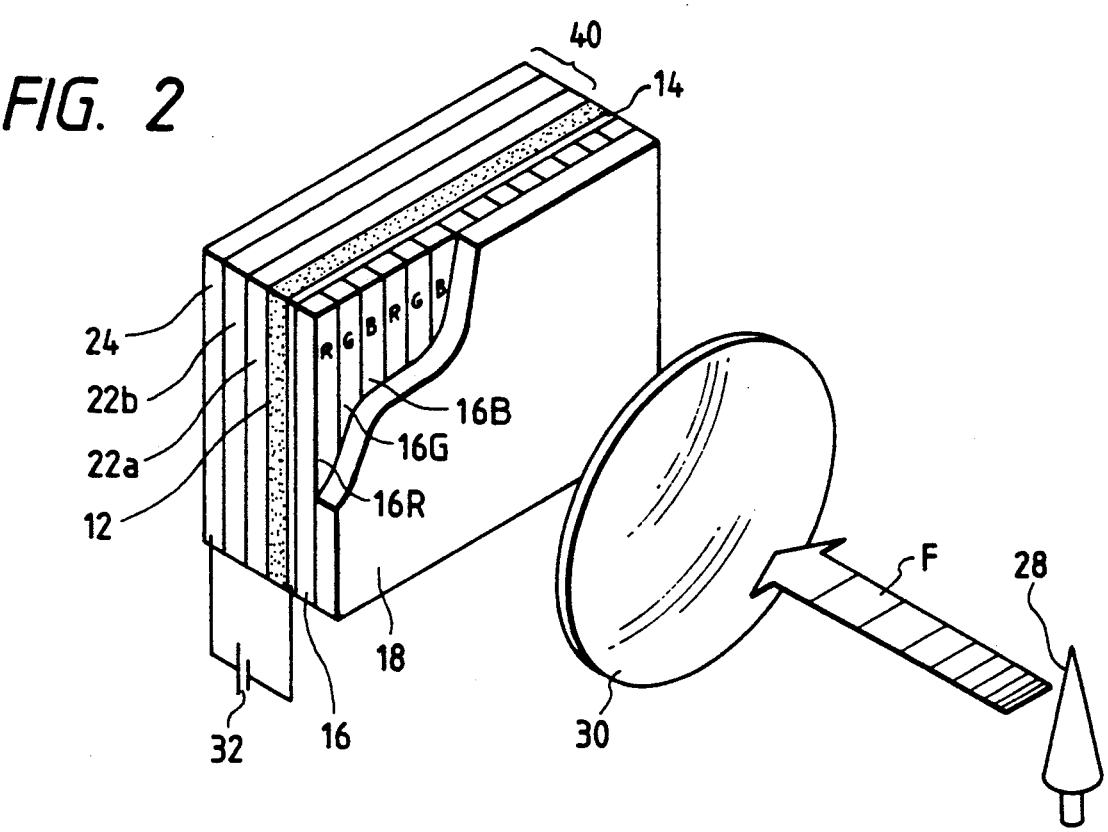

RECORDING HEAD WITH CARRIER GENERATION AND TRANSPORT LAYERS ADJACENT A PHOTO-MODULATION LAYER FOR RECORDING INFORMATION INCLUDED IN AN ELECTRO-MAGNETIC RADIATION-BEAM APPLIED THERETO

BACKGROUND OF THE INVENTION

1. Field of the Invention

This invention relates to a recording apparatus for recording information included in an electro-magnetic radiation-beam applied thereto and a recording head used for the same.

2. Description of the Prior Art

A recording apparatus for recording information included in an electro-magnetic radiation-beam applied thereto are known, which comprises a recording medium including a color-separation filter and a recording layer. A recording head used for the recording apparatus comprises a photoconductive layer having a carrier transport layer and a carrier generation layer, an electrode layer, and a base layer which are laminated in order of mention. Such prior art recording apparatus and the recording head are disclosed in Japanese patent application No. 1-128069.

Hereinbelow will be described this prior art recording apparatus and recording head with reference to drawings.

FIG. 8 is a perspective view showing the prior art recording apparatus and recording head wherein a photoconductive layer 22 and a recording layer 12 separated are shown.

In FIG. 8, a recording medium 10 capable of formation of a latent charge image, comprises the recording layer 12, a transparent electrode layer 14, a color separation filter layer 16, and a glass base layer 18, which are laminated in order of mention.

The recording head 20 comprises the photoconductive layer 22 including a carrier transport layer 22b and a carrier generation layer 22a, an electrode layer 24, and a base layer 26 which are laminated in order of mention.

The recording medium 10 and the recording head 20 are arranged such that the recording layer 12 and the carrier transport layer 22b of the photoconductive layer 22 face each other with a given space. An optical image of an object 28 enters there through the glass base layer 18 of the recording medium 10 via the object lens 30.

In FIG. 8, a power supply 32 with a given voltage is connected between the transparent electrode layer 14 and the electrode layer 24. It generates discharge between the recording layer 12 and photoconductive layer 22.

The color separation filter layer 16 comprises thin bar-shaped filters 16R, 16G, and 16B arranged in order of mention for color-separation by transmitting primary color lights or red (R), green (G), and blue (B) by filters 16R, 16G, and 16B respectively.

A charge retaining material for retaining charges on its surface or therein and photo-modulation member whose optical characteristic varies, can be used for the recording layer 12.

Hereinbelow will be described operation of recording of the prior art.

In FIG. 8, the optical image of the object 28 enters the object lens 30 from the right of the drawing as shown by an arrow F and enters the photoconductive layer 22 of the recording head 20 through the object lens 30 and the recording medium 10.

The filters 16R, 16G, and 16B of the color separation filter layer 16 separate the incident light into three primary colors. That is, the filter 16R allows only R component of the incident light to transmit therethrough; the filter 16G, only G component, and the filter 16B, only B component. That is, the filter layer 16 performs color separation. These color-separated transmitted light beams enter the photoconductive layer 22 through the transparent electrode layer 14 and the recording layer 12.

The photoconductive layer 22 is formed by laminating the carrier transport layer 22b and the carrier generation layer 22a as mentioned above. The carrier transport layer 22b faces the recording layer 12. Thus, the color-separated light beams transmit the carrier transport layer 22b and enter the carrier generation layer 22a. The incident light beams are absorbed by the carrier generation layer 22a, so that carriers are generated in the carrier generation layer 22a. As mentioned above, the potential of the power supply 32 is applied between the transparent electrode layer 14 and the electrode layer 24. Therefore, holes of the carriers generated in the carrier generation layer 22a move through the carrier transport layer 22b to a surface of the carrier transport layer 22b opposite to the recording layer 12.

This movement produces a charge image corresponding to the optical image of the object 28 on the surface of the photoconductive layer 22.

Such operation is made for each of separated light beams of R, G, and B, so that positive charge images are formed with respect to every separated light beam.

Then, application of the given voltage of the power supply 32 generates discharge between confronting surfaces of the recording layer 12 and the photoconductive layer 22.

This discharge produces a charge Q on the surface of the recording layer 12 and is accumulated and retained on its surface. In this case, the degree of the charge due to the discharge corresponds the positive charge image accumulated. Therefore, an image corresponding to the optical image of the object 28 is transferred on the surface of the recording layer 12. In other words, an amount of a charge per unit area on the recording layer is relates to an intensity of light per the unit area.

When the charge retaining layer is used for the recording layer 12, a charge latent image corresponding to the optical image of the object 28 is recorded on the surface of the charge retaining layer of the recording medium 10. The positive charges on the charge retaining layer are produced for each of separated light beams, so that for each of the separated light beams of R, G, and B, a charge latent image is formed.

When photo-modulation material is used for the recording layer 12, the photo-modulation layer reacts to an electric field, so that an image is recorded as a change in optical characteristic of the photo-modulation layer.

However, there is a problem that the resolution decreases and thus, a normal color separation is difficult because an electro-magnetic radiation beam from the object 28 is color-separated and then enters the carrier generation layer 22a through the carrier transport layer 22b whose a thickness ranging from several micron meters to tens micron meters.

Moreover, there is a possibility that a sensitivity of the carrier generation layer at a specific band would decrease because there is a spectral transmission factor characteristic of the carrier transport layer 22b.

SUMMARY OF THE INVENTION

The present invention has been developed in order to remove the above-described drawbacks inherent to the conventional recording apparatus for recording information included in an electro-magnetic radiation-beam applied thereto and the conventional record head used for the same.

According to the present invention there is provided a first recording apparatus for recording information included in an electro-magnetic radiation-beam applied thereto, comprising: a first electrode layer which transmits the electro-magnetic-beam incident thereto; a second electrode layer facing the first electrode layer for applying a given voltage between the first electrode layer and the same; a carrier generation layer provided between the first and second electrode layers responsive to the electro-magnetic beam from the first electrode layer for generating carriers in accordance with intensity of the electro-magnetic beam per unit area on the same; a carrier transport layer sandwiched between the carrier generation layer and the second electrode layer for transporting the carriers toward the second electrode layer in response to an electric field produced by application of the given voltage to the first and second electrode layers; and a recording layer provided between the first electrode layer and the carrier generation layer for recording the information by retaining charges developed by transportation of the carriers in the carrier transport layer, the recording layer transmitting the electro-magnetic beam from the first electrode layer.

The recording layer and the carrier generation layer are spaced at a given distance or laminated with each other. The first recording apparatus may further comprises: color-separation filter including a set of plural different color filters, arranged in at least one direction for color-separating the electro-magnetic beam, the color-separation filter arranged such that the electro-magnetic beam incident thereto enters the recording layer after color-separation by the same.

According to the present invention there is also provided a second recording apparatus for recording information included in an electro-magnetic radiation-beam applied thereto, comprising: a first electrode layer which transmits the electro-magnetic-beam incident thereto; a second electrode layer facing the first electrode layer for applying a given voltage between the first electrode layer and the same; a carrier generation layer provided between the first and second electrode layers responsive to the electro-magnetic beam from the first electrode layer for generating carriers in accordance with intensity of the electro-magnetic beam per unit area on the same; a carrier transport layer sandwiched between the carrier generation layer and the second electrode layer for transporting the carriers toward the second electrode in response to an electric field produced by application of the given voltage to the first and second electrode layers; and a photo-modulation layer provided between the first electrode layer and the carrier generation layer for recording the information by change in electro-optic characteristic thereof in response to the electric field modulated by the carriers transported in the carrier transport layer, the recording layer transmitting the electro-magnetic beam from the first electrode.

According to the present invention there is further provided recording head for recording information included in an electro-magnetic radiation-beam applied thereto in a recording layer to be faced the same, the recording layer having a first electrode layer comprising: a second electrode layer; a carrier transport layer formed on the recording layer'side surface of the electrode layer; and a carrier generation layer formed on the carrier transport layer for generating carrier in response to the electro-magnetic radiation-beam transmitted through the recording layer in accordance with intensity of the electro-magnetic radiation-beam per unit area at the same, the carrier transport layer transporting the carrier toward the second electrode layer in response to application of a given voltage between the first and the second electrode layer, the recording layer recording the information by using the transported carriers and the application of the given voltage.

BRIEF DESCRIPTION OF THE DRAWINGS

The object and features of the present invention will become more readily apparent from the following detailed description taken in conjunction with the accompanying drawings in which:

FIG. 1 is a perspective view of a first embodiment of the invention of the recording apparatus and recording head;

FIG. 2 is a perspective view of a second embodiment of the invention;

The same or corresponding elements or parts are designated as like references throughout the drawings.

DETAILED DESCRIPTION OF THE INVENTION

Hereinbelow will be described a first embodiment of this invention with reference to FIG. 1.

FIG. 1 is a perspective view of a first embodiment of the invention of a recording apparatus and a recording head whose photoconductive layer 22 is separated from a recording layer 12.

Figure 8:
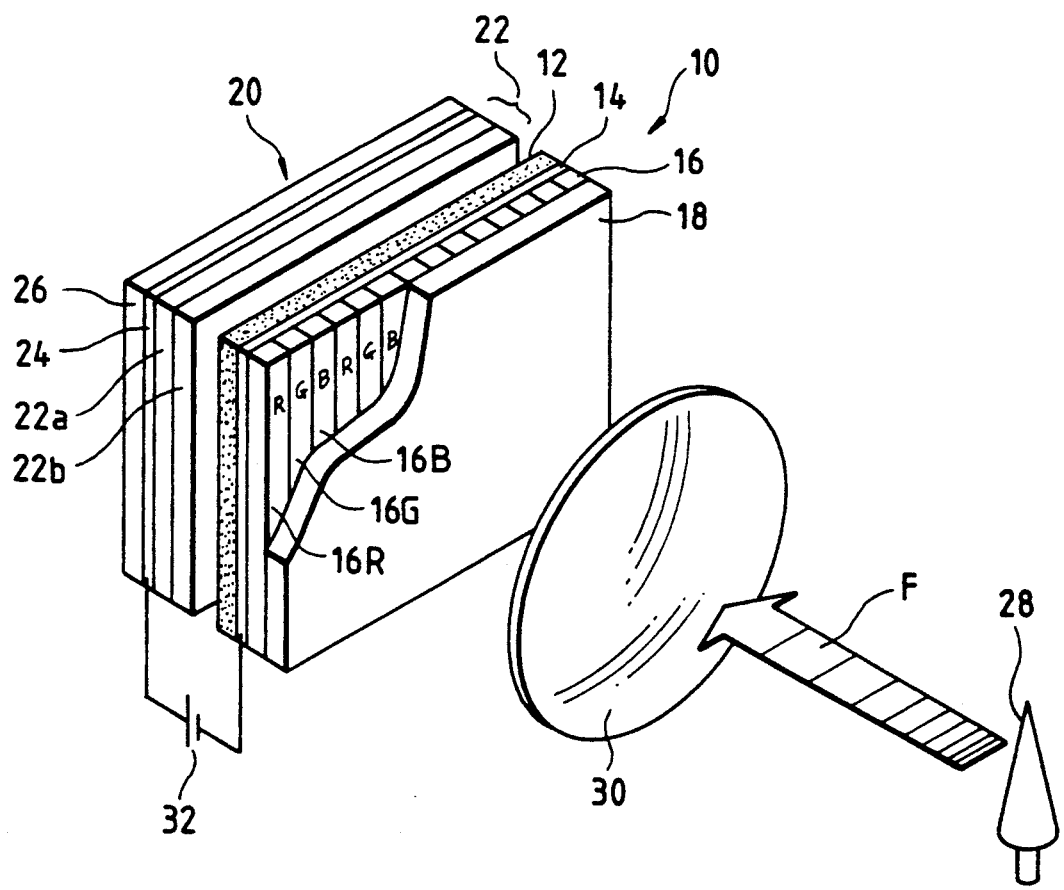
FIG. 8 is a perspective view showing the prior art recording apparatus and recording head.

In FIG. 1, a recording medium 10 capable of formation of a latent charge image, comprises the recording layer 12, a transparent electrode layer 14, a color separation filter layer 16, and a glass base layer 18 which are laminated in order of mention. The recording medium 10 has the same structure as that of the prior art shown in FIG. 8.

On the other hand, a recording head 40 comprises the photoconductive layer 22 including a carrier generation layer 22a and carrier transport layer 22b, an electrode layer 24, and a base layer 26, which are laminated in order of mention. The arrangement of the carrier generation layer 22a and carrier transport layer 22b is different from that of the prior art of FIG. 8.

The recording medium 10 and the recording head 40 are arranged such that the recording layer 12 and the photoconductive layer 22 face each other with a given space. An optical image of an object 28 enters the recording medium through the glass base layer 18 via the object lens 30.

FIG. 2 is a perspective view of a second embodiment of the invention wherein the photoconductive layer 22 is laminated on the recording layer 12. The second embodiment of FIG. 2 has the same component as that shown in FIG. 1. That is, the second embodiment comprises the glass base layer 18, the color separation filter layer 16, the transparent electrode layer 14, the recording layer 12, the photoconductive layer 11 including the carrier generation layer 22a and the carrier transport layer 22b, and the electrode layer 24 are laminated in order of mention. The recording medium 10 and the recording head 40 are combined together by lamination.

In FIGS. 1 and 2, a power supply 32 is connected between the transparent electrode layer 14 and the electrode layer 24. It generates discharge between the recording layer 12 and the photoconductive layer 22.

The color separation filter layer 16 comprises thin bar-shaped filters 16R, 16G, and 16B arranged in order of mention for transmitting primary color lights of red R, green G, and blue B respectively.

A charge retaining material, for example, a high resistance material such as a silicone resin and a material in which photoconductive fine particles are included in and near a surface of the resin, for retaining carriers on its surface or therein can be used as the recording layer 12. The light modulation material, for example, a polymer dispersed liquid crystal film or PLZT (Lead Lanthanum Zirconate Titanate) which records information by change in optical characteristic in response to application of an electric field, can also be used as the recording layer 12.

Hereinbelow will be described operation of recording shown in FIGS. 1 and 2.

The light from the object 28 enters the object lens 30 from the right of the drawing as shown by an arrow F and enters the photoconductive layer 22 of the recording head 40 through the object lens 30 and the recording medium 10.

The filters 16R, 16G, and 16B of the color separation filter layer 16 separates the incident light into three primary colors. That is, the filier 16R allows only R component of the incident light to transmit therethrough; the filter 16G, only G component, and the filter 16B, only B component. These color-separated transmitted light beams enter the photoconductive layer 22 through a transparent electrode layer 14 and the recording layer 12.

The photoconductive layer 22 is formed by laminating the carrier generation layer 22a and the carrier transport layer 22b as mentioned above. The carrier generation layer 22a faces the recording layer 12. Thus, the color separated transmittied light beams enter the carrier generation layer 22a. The incident light beams are absorbed by the carrier generation layer 22a, so that carriers are generated in the carrier generation layer 22a. As mentioned above, a voltage of the power supply 32 is applied between the transparent electrode layer 14 and the electrode layer 24. Therefore, electrons of the carriers generated in the carrier generation layer 22a move through the carrier transport layer 22b toward the electrode layer 24 by an attraction force from plus polarity of the power supply 32. On the other hand, holes of carriers move to a surface of the carrier transport layer 22b opposite to the recording layer 12.

This movement, i.e., an electric field, produces a charge image corresponding to the optical image of the object 28 on the surface of the photoconductive layer 22. Such operation is performed for each of separated light beams of R, G, and B, so that positive charge images are formed for every separated light beam.

Then, in the first embodiment shown in FIG. 1 that the recording layer 12 and the photoconductive layer 22 are separated from each other, application of potential of the power supply 32 generates discharge between confronting surfaces of the recording layer 12 and the photoconductive layer 12. This discharge produces a charge on the surface of the recording layer 12 and the charge Q is accumulated and retained on the surface. In this case, the degree of the charge due to the discharge corresponds the positive charge image. Therefore, an image corresponding to the optical image of the object 28 is transferred on the surface of the recording layer 12.

When a charge retaining layer is used for the recording layer 12, a charge latent image of the optical image of the object 28 is recorded on the surface of the charge retaining layer. The positive charge on the charge retaining layer of the photoconductive layer 22 are produced for each of separated light beams, so that the charge latent images in the recording medium 10 are also formed for each of the separated light beams of R, G, and B.

When a photo-modulation material is used for the recording layer 12, the photo-modulation layer reacts by the recording head 40, so that an image is recorded as a change in optical characteristic.

Moreover, in the second embodiment where the recording medium 10 and the recording head 40 are combined together, the image can be recorded on the recording layer 12 directly without aerial discharge. In this case, the charge retaining material or the photo-modulation layer can be used for the recording layer 12.

Hereinbelow will be described the reproducing operation with reference to FIG. 3.

Figure 3:
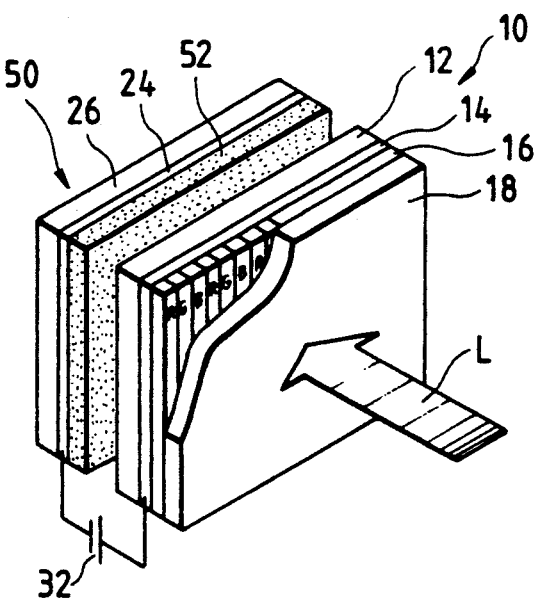
FIG. 3 is a perspective view of the third embodiment.

FIG. 3 is a perspective view of the third embodiment for illustrating the operation of reproducing by the recording layer 12 comprising the charge retaining material where a latent charge image is formed. In FIG. 3, the same elements as those shown in FIGS. 1 and 2 are designated the same reference.

A reproduce head 50 is arranged such that it faces the recording layer 12 comprising a charge retaining material where a latent charge image is formed.

The reproduce head 50 comprises a photo-modulation layer 52 made of a photo-modulation material, an electrode layer 24, a base layer 26. The exposed surface of the light modulation layer 52 faces the recording layer 12 of the recording medium 10. A read-out beam L shown by an arrow enters the reproduce head 50 through the recording medium 10. As the read-out light L, white light is used.

The light modulation layer 52 produces phase difference between an ordinary ray and an extraordinary ray through electro-optical effect when the read-out light L enters there. A high polymer.liquid crystal composite film or PLZT and the like can be used for the photo-modulation layer whose optical characteristic is changed by application of an electric field.

The charge image of the object 28 is formed on the recording medium 10 as mentioned as to FIG. 1.

The reproduce head 50 is arranged near the recording medium 10. The transparent electrode layer 14 and 24 are connected the power supply 32, as shown. Then, the electric field of the latent charge Q on the surface of the recording layer 12 effects the photo-modulation layer 52, so that electro-optical effect occurs in response to the incident light. In this state, when the read-out light inters the recording medium 10 as shown by the arrow L, the read-out light L is color-separated in to R, G, and B by the color separation filter 16 as the recording system mentioned above does. Therefore, the color-separated light R, G, and B enters the reproduce head 50 through the color-separation filter 16. When the color-separated light R, G, and B enters the reproduce head 50, electro-optical effect occurs in the light modulation layer 52, so that it enables the reproduction of color image of the object 28.

Figure 4:
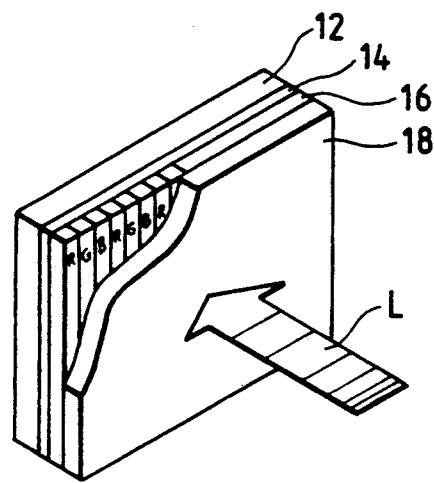
FIG. 4 is a perspective view of the fourth embodiment of reproduction.

FIG. 4 is a perspective view of the fourth embodiment of reproduction.

In FIG. 4, the recording layer 12 is made of a photo-modulation material. There is a different from the third embodiment in needlessness of the reproducing head 50. The read-out light L transmits the color separation filter 16, enters the photo-modulation layer 12 made of the photo-modulation material, so that electro-optical effect developed provides a color image of the object directly.

Figure 5:
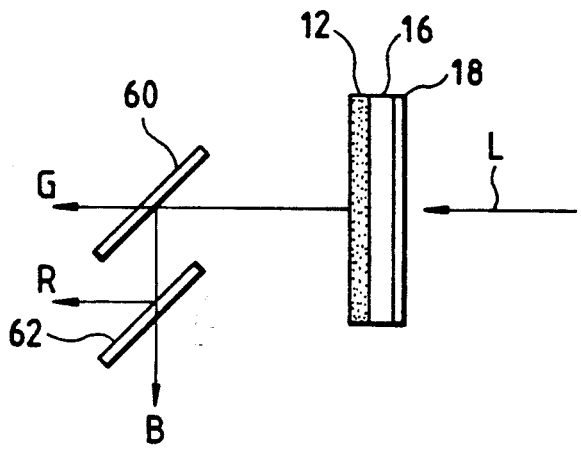
FIG. 5 is a perspective view of a fifth embodiment of reproducing.

FIG. 5 is a perspective view of a fifth embodiment of reproducing.

In the third embodiment, the dichroic mirrors 60 and 62 are provided in addition to the structure of the fourth embodiment. The read-out light L transmitted through the recording layer 12 comprising the color separation filter 16 and the photo-modulation layer enters the first dichroic mirror 60. The first dichroic mirror 60 only transmit a separation light beam G and reflects the remaining components R and B to the following dichroic mirror 62. The dichroic mirror 62 reflects separation light beam R and transmits a separation light beam B therethrough. As mentioned, the dichroic mirrors 60 and 62 separate the read-out light L into components R, G, and B. These components R, B, and B provide reproduction of color-separation image of the optical image of the object 28. If required, it can be converted into an electric signal by a photoelectric conversion means. Moreover, the read-out light L can be projected on a surface two-dimensionally or by using scanning.

Figure 6:
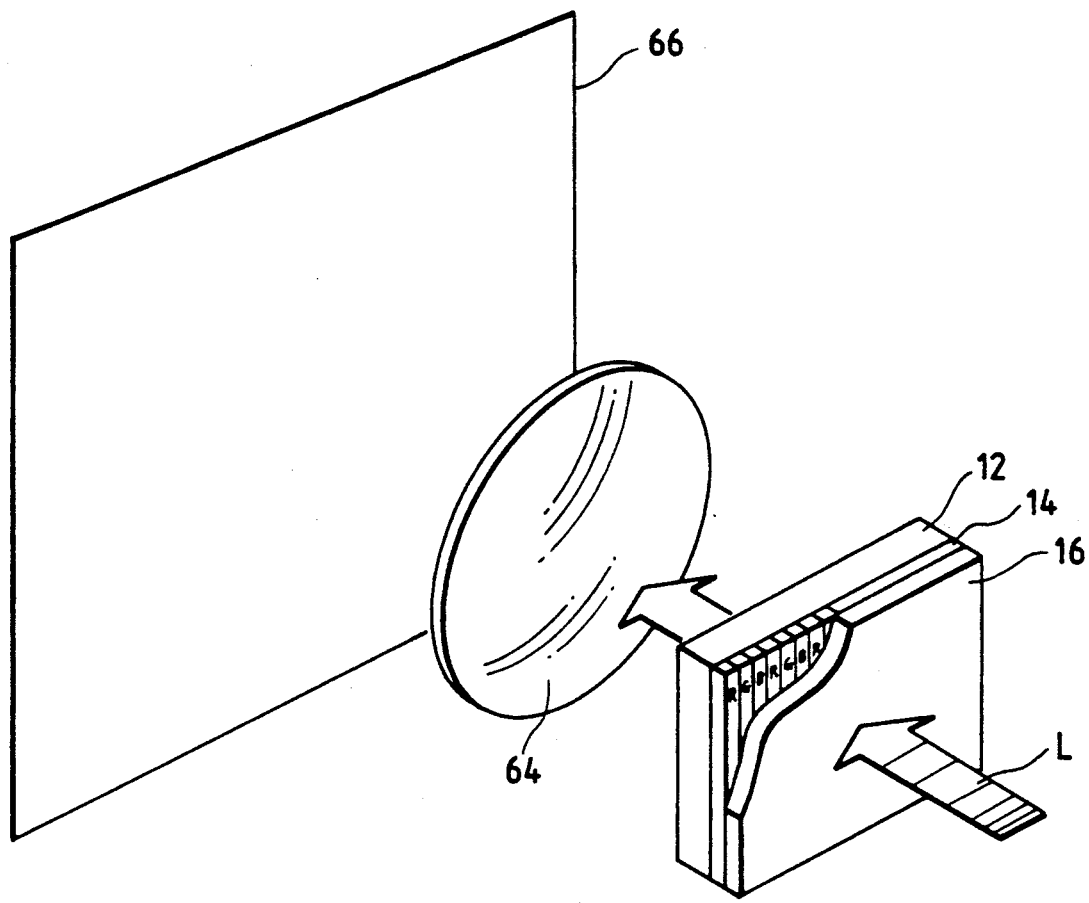
FIG. 6 is an illustration for showing the sixth embodiment of reproducting.

FIG. 6 is an illustration for showing the sixth embodiment of reproducing for displaying a color image by directly projecting the read-out light L transmitted through the recording medium 10.

This embodiment comprises the color separation filter 16 and the photo-modulation layer. The read-out light L transmitted through the recording layer 12 on which a latent charge image is formed is directly projected to a screen by a project lens 64.

Figure 7:
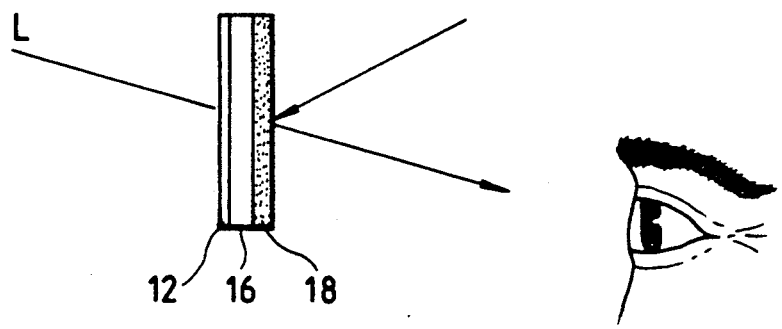
FIG. 7 is an illustration for illustrating a seventh embodiment.

FIG. 7 is an illustration for illustrating a seventh embodiment. The read-out light L transmitted through the recording layer 12 on which a latent charge image is formed, comprising a photo-modulation layer is observed by the human eyes through the color separation filter 16.

In addition to the strip type of the color separation filter 16 used in FIGS. 1 to 7, other type of color filter having a given shape can be used such as an island type. Moreover, other type of color filters having a given combination of passbands other than R, G, and B an be used.

What is claimed is:

1. A recording apparatus for recording information included in an electro-magnetic radiation-beam applied thereto, comprising:

(a) a first electrode layer which transmits said electro-magnetic-beam incident thereto;

(b) a second electrode layer facing said first electrode layer for applying a given voltage between said first and second electrode layer;

(c) a carrier generation layer provided between said first and second electrode layers responsive to said electro-magnetic beam from said first electrode layer for generating carriers in accordance with an intensity of said electro-magnetic beam per unit area of said carrier generation layer;

(d) a carrier transport layer sandwiched between said carrier generation layer and said second electrode layer for transportiong said carriers toward said second electrode layer in response to an electric field produced by application of said given voltage to said first and second electrode layer; and (e) a recording layer provided between said first electrode layer and said carrier generation layer for recording said information by retaining charges developed by transportation of said carriers in said carrier transport layer, said recording layer transmitting said electro-magnetic beam from said first electrode layer.

2. A recording apparatus as claimed in claim 1, wherein said recording layer and said carrier generation layer are spaced at a given distance and said carriers are developed by a discharge produced by said application of said given voltage.

3. A recording apparatus as claimed in claim 1, wherein said recording layer is laminated on said carrier generation layer.

4. A recording apparatus as claimed in claim 1, further comprising:

color-separation filter means including a set of plural different color filters, arranged in at least one direction for color-separating said electro-magnetic beam, said color-separation filter means arranged such that said electro-magnetic beam incident thereto enters said recording layer after color-separation by said filter means.

5. A recording apparatus for recording information included in an electro-magnetic radiation-beam applied thereto, comprising:

(a) a first electrode layer which transmits said electro-magnetic-beam incident thereto;

(b) a second electrode layer facing said first electrode layer for applying a given voltage between said first and second electrode layer;

(c) a carrier generation layer provided between said first and second electrode layers responsive to said electro-magnetic beam from said first electrode layer for generating carriers in accordance with an intensity of said electro-magnetic beam per unit area of said carrier generation layer;

(d) a carrier transport layer sandwiched between said carrier generation layer and said second electrode layer for transporting said carriers toward said second electrode in response to an electric field produced by application of said given voltage to said first and second electrode layers; and (e) a photo-modulation layer provided between said first electrode layer and said carrier generation layer for recording said information by a change in electro-optic characteristic thereof in response to said electric field modulated by said carriers transported in said carrier transport layer, said recording layer transmitting said electro-magnetic beam from said first electrode.

6. A recording apparatus as claimed in claim 5, wherein said recording layer and said carrier transporting layer are spaced at a given distance and said change is produced by a discharge produced by said application of said given voltage.

7. A recording apparatus as claimed in claim 5, wherein said recording layer is laminated on said carrier generation layer.

8. A recording apparatus as claimed in claim 5, further comprising:

color-separation filter means including a set of plural different color filters, arranged in at least one direction for color-separating said electro-magnetic beam, said color-separation filter means arranged such that said electro-magnetic beam incident thereto enters said recording layer after color-separation by said filter means.

9. A recording head for recording information included in an electro-magnteic radiation-beam applied to a recording layer therein, said recording head further comprising:

(a) a first and second electrode layer;
(b) a carrier transport layer formed on a surface of said second electrode layer in a position between said first and second electrode layer; and
(c) a carrier generation layer formed on said carrier transport layer for generating carriers in response to said electro-magnetic radiation-beam transmitted through said recording layer in accordance with an intensity of said electro-magnetic radiation-beam per unit area of said carrier generation layer, said carrier transport layer transporting said carriers toward said second electrode layer in response to application of a given voltage between said first and said second electrode layer, said recording layer recording said information by using said transported carriers and said application of said given voltage.

* * * * *